United States Patent
Csaszar et al.

(10) Patent No.: US 8,181,014 B2
(45) Date of Patent: May 15, 2012

(54) METHOD AND APPARATUS FOR PROTECTING THE ROUTING OF DATA PACKETS

(75) Inventors: Andras Csaszar, Budapest (HU); Lars Westberg, Enköping (SE); Mats Naslund, Bromma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 387 days.

(21) Appl. No.: 12/599,472

(22) PCT Filed: May 9, 2008

(86) PCT No.: PCT/SE2008/050538
§ 371 (c)(1),
(2), (4) Date: Nov. 9, 2009

(87) PCT Pub. No.: WO2008/147302
PCT Pub. Date: Dec. 4, 2008

(65) Prior Publication Data
US 2010/0250930 A1    Sep. 30, 2010

Related U.S. Application Data

(60) Provisional application No. 60/916,911, filed on May 9, 2007.

(51) Int. Cl.
*H04L 29/06*    (2006.01)

(52) U.S. Cl. .......... 713/153; 713/150; 709/238
(58) Field of Classification Search .......... None
See application file for complete search history.

(56) References Cited

U.S. PATENT DOCUMENTS

| | | | | |
|---|---|---|---|---|
| 6,101,543 | A | * | 8/2000 | Alden et al. .......... 709/229 |
| 2004/0249974 | A1 | * | 12/2004 | Alkhatib et al. .......... 709/245 |
| 2006/0059337 | A1 | | 3/2006 | Poyhonen et al. |
| 2008/0235507 | A1 | * | 9/2008 | Ishikawa et al. .......... 713/150 |

FOREIGN PATENT DOCUMENTS

JP    2000261486 A    9/2000

* cited by examiner

Primary Examiner — Ponnoreay Pich

(57) ABSTRACT

A method and apparatus for protecting the routing of data packets in a packet data network. When a first end-host sends an address query to a DNS server system regarding a second end-host, the DNS server system responds by providing a destination parameter containing an encrypted destination address associated with the second end-host. Thereby, the first end-host is able to get across data packets to the second end-host by attaching the destination parameter to each transmitted data packet. A router in the packet data network admits a received packet if a destination parameter is attached to the packet including a valid destination address encrypted by a key dependent on a distributed master encryption key. Otherwise, the router discards the packet if no such valid destination address can be derived from the packet by applying decryption to the destination parameter.

16 Claims, 4 Drawing Sheets

METHOD AND APPARATUS FOR PROTECTING THE ROUTING OF DATA PACKETS

This application claims the benefit of U.S. Provisional Application No. 60/916,911, filed May 9, 2007, the disclosure of which is fully incorporated herein by reference.

TECHNICAL FIELD

The present invention relates generally to a method and apparatus for protecting the routing of data packets in a public packet data network such as the Internet.

BACKGROUND

Packet-based transmission of digitally encoded information between different parties over IP (Internet Protocol) networks is used for a variety of communication services, such as e-mail messaging, Internet browsing, voice and video telephony, content streaming, games, and so forth. Digitally encoded information is arranged into data packets at a sending party, which are then transmitted towards a targeted receiving party over a transmission path. The transmission path between the sending party and the receiving party may include various networks, switches, gateways, routers and interfaces. The communicating parties are often referred to as "end-hosts" which may be any type of equipment capable of packet-based IP communication, such as fixed and mobile telephones, computers, servers, game stations, etc. In this description, the term end-host will generally represent any such communication equipment.

An end-host connected to the Internet has typically been assigned a forwarding identity in the form of an IP address needed for routing any data packets directed to that end-host along the transmission path. Typically, the end-host has also been assigned a more or less intelligible name in a text string, e.g. a conventional e-mail address or web address, such as user@operator.com, which is associated with the assigned IP address. A DNS (Domain Name Server) system comprising a hierarchy of DNS servers is used for retrieving the current IP address of a particular host name. Thus, an end-host can query the DNS system with a host name to communicate with, and the DNS will then reply by providing the current IP address of the corresponding end-host. This type of query is sometimes referred to as a destination query, identity query or address query, the latter being used in throughout this description.

Data packets are basically configured with a data field containing payload data and a header field in which the sending end-host inserts the destination address of the target end-host, i.e. the IP address obtained from the DNS system. Thus, each data packet is routed over multiple network nodes, often referred to as IP routers, along the transmission path based on the destination address in the packet's header field.

In addition to simply receiving and forwarding data packets, an IP router may also be capable of other functions such as security control, packet scheduling, and translation of addresses and protocols. Further, end-hosts may have a firewall functionality for determining whether incoming data packets should be admitted or discarded, e.g. according to settings made by the user.

Each router in an IP network typically comprises ingress and egress units acting as interfaces for receiving and sending data packets, respectively. The router also comprises a routing or forwarding function for determining which router an incoming data packet should be sent to as a "next hop", based on a forwarding table defined in the router. As is well-known in this field, a data packet can often be routed along multiple alternative paths depending on the network topology and the current traffic load.

Links to the nearest neighbouring routers are provided in each router by means of corresponding ports, and a forwarding architecture is also configured in the routers based on the distribution of topology information and link information. Each port can have an IP address and an IP mask configured on its interfaces and routing protocols are used to distribute this information among the routers in the network in a configuring procedure. From the distributed topology information, each router then calculates its own forwarding table, containing multiple destination IP-addresses and associated outgoing ports. As each incoming data packet has a destination IP-address in its header, the forwarding table is used to find the suitable entry in the forwarding table from that IP-address. The main function of the forwarding table is thus to determine the appropriate outgoing port for each incoming packet.

In FIG. 1, the basic structure of a conventional IP router 100 is shown, when situated in an IP network. Among other things, IP router 100 comprises an ingress part 100a, an egress part 100b and a forwarding function here schematically represented by a forwarding table 100c. The egress part 100b comprises a plurality of outgoing ports $P_A$, $P_B$, $P_C$, ... leading to different neighbouring routers A, B, C, ..., respectively, to which router 100 is directly connected. Any incoming data packet 102 has a payload field PL and a header H, the latter containing the destination address for the packet.

The forwarding table 100c is comprised of multiple entries each containing an IP mask, an IP address and an outgoing port number. The IP mask may be defined in terms of a hexadecimal encoded string such as, e.g., FF.FF.FF.0, or FF.FF.8.0, etc. Briefly described, the destination address in header H is compared with the IP masks in forwarding table 100c by applying a logic "AND"-operation, in order to detect a matching entry with the same IP address. Once a matching entry is found, the packet can be sent out on the outgoing port according to the port number of that entry.

The incoming data packet 102, which may have been forwarded from a previous router (not shown) to router 100, is thus first received at the ingress unit 100a. It is then determined which next router the packet should be sent to, based on the destination address in header H and using the forwarding table 100c and the above logic "AND"-operation. In this example, the incoming packet 102 has a destination IP address that, when combined with the mask, matches the IP address of an entry in forwarding table 100c having port number $P_C$. The packet 102 is therefore sent out on the corresponding port which is connected to router C.

As mentioned above, a routing protocol is used to distribute topology and link information among the routers in an IP network. The currently used routing protocols are configured to obtain "resilience", i.e. packets must be re-routed in a different path in the case of link or node failure in the original path. The routing protocols are also configured to facilitate router management, since configuring routers is typically a cumbersome task which is generally desirable to simplify. Thus, in case of link or node failure, the routing protocol will reconfigure the forwarding table in affected routers and at the same time distribute the information to the routers, thereby simplifying the management.

In order to obtain scalability, which otherwise is an inherent problem in the routing architecture, the routing process can be based on a hierarchical bit-mask scheme. FIG. 2 illustrates an example of such a hierarchical bit-mask scheme, where the bit-masked IP addresses form a hierarchic structure by partly bit-masking a least significant part of the addresses.

Thus, an exemplary top level bit-masked IP address is shown as "1.x.x.x", and on a next level in the structure three exemplary bit-masked address are shown as "1.1.1.x", "1.1.2.x", and "1.1.3.x" each covering a set of unmasked IP addresses on the lowest level of the hierarchy. This type of hierarchical bit-mask scheme is typically used in the routing architecture to facilitate the above-described matching operation in the forwarding table.

However, a major problem in IP-networks and the Internet is that the security support is generally insufficient, as explained below. The current routing architecture and protocols were originally designed for a "friendly" environment, i.e. assuming that there are no "illicit" or "corrupt" users communicating in IP networks. Nevertheless, various security solutions have been added to the IP architecture in order to protect the communicated data, such as IP-sec on a low layer and also TLS (Transport Layer Security) on a higher layer. Further, MPLS (Multiprotocol Label Switching) is a solution for building Layer 3 VPNs (Virtual Private Networks) to ensure secure communication. In the VPN case when an intranet is used, private addressing is required and the network is somewhat isolated from the public Internet such that external un-authorized hosts are not allowed to reach and communicate with the hosts attached to the intranet.

Other prior solutions for providing security in the routing protocol include: secure communication between routers such that no illicit entity can eavesdrop, manipulate or imitate a router, the establishment of IP-sec tunnels between router ports to protect the transport of packets between routers, and link security on the layer 2. Various authentication procedures and cryptographic keys can also be used, e.g. according to DNSSec (DNS Security), HIP (Host Identity Protocol) and CGA (Cryptographically Generated Addresses), to enhance the security. While protection against unwanted traffic is used for certain applications (e.g. spam filtering for e-mails), no basic protection against violating end-hosts and unwanted data packets has been generally provided in the public IP infrastructure, though.

Since the internal forwarding identities, i.e. IP addresses, are publicly distributed end-to-end in the manner described above, any end-host is basically able to send messages and data packets to any other end-host over the Internet, resulting in the well-known problems of flooding, spamming, virus, fraud and so-called "Denial-of-service" (DoS) threats. Hence, it is generally a problem that any end-host can get across data packets totally out of control of the receiving end-host, and that public IP networks such as the Internet have no mechanism in the IP infrastructure for preventing that data packets from potentially illicit or corrupt end-users are routed to the receiver. As a result, more or less complex functionality must be added at the end-host or in the link layer, such as firewalls or the like, in order to limit the connectivity. Moreover, these solutions are "last line of defence" solutions, meaning that unwanted data can still consume resources along the entire sender-receiver path, only to be discarded at the receiver.

SUMMARY

It is an object of the present invention to address at least some of the problems outlined above. It is also an object to obtain a mechanism for protecting the routing of data packets in a packet data network. These objects and others can be achieved primarily by providing a method and apparatus as defined in the attached independent claims.

According to one aspect, a method is provided for protecting the routing of data packets in a packet data network, as performed by a DNS server system. When an address query is received from a first end-host regarding a second end-host, the DNS system retrieves a destination address associated with the second end-host. The retrieved destination address is encrypted by a key dependent on a master key that has been distributed to routers in the packet data network, and a destination parameter is created containing the encrypted destination address. The created destination parameter is then sent to the first end-host in response to the address query, thereby enabling the first end-host to get across data packets to the second end-host by attaching the destination parameter to each transmitted data packet.

According to another aspect, an apparatus is provided in a DNS server system for protecting the routing of data packets in a packet data network. The apparatus comprises a master key manager adapted to distribute a master key to routers in the packet data network, an address query manager adapted to receive an address query from a first end-host regarding a target second end-host, and a host database for storing destination addresses associated with end-hosts and adapted to provide a destination address of the second end-host. The apparatus further comprises an encryption unit adapted to encrypt the destination address by using a key dependent on the master key, and to create a destination parameter containing the encrypted destination address. The address query manager is further adapted to send the created destination parameter to the first end-host in response to the address query, thereby enabling the first end-host to get across data packets to the second end-host by attaching the destination parameter to each transmitted data packet.

Different embodiments are possible in the method and apparatus above. For example, authentication of the first end-host may be required in order to process the query, such that the query is rejected if the first end-host is not authenticated. Further, the destination address may be randomised by including a bit-sequence when creating the destination parameter.

According to yet another aspect, a method is provided for protecting the routing of data packets in a packet data network, as performed by a router in the packet data network. When a data packet is received, the router attempts to decrypt the received data packet using a key dependent on a DNS distributed master key. The packet is admitted if a destination parameter including a valid destination address can be derived from the packet by decryption, and the packet is discarded if no such destination parameter can be derived from the packet by decryption. If admitted, a forwarding operation is performed for the packet based on the destination address to determine an outgoing port for the packet. The destination address is then encrypted and a new destination parameter is created for the packet including the newly encrypted destination address. The packet is finally sent to a next hop node from the determined outgoing port with the created new destination parameter attached to the packet.

According to yet another aspect, an apparatus is provided in a router in a packet data network for protecting the routing of data packets, comprising an ingress part for receiving data packets, a forwarding unit, and an egress part for sending out packets from the router. The forwarding unit includes a decryption unit adapted to attempt decryption of a received data packet using a key dependent on a DNS distributed master key. The forwarding unit is adapted to admit the packet if a destination parameter including a valid destination address can be derived from the packet by decryption, and to discard the packet if no such destination parameter can be derived from the packet by decryption. The forwarding unit is further adapted to perform a forwarding operation based on the decrypted destination address to determine an outgoing port for the packet. The forwarding unit further includes an encryption unit for encrypting the destination address and creating a new destination parameter for the packet including the newly encrypted destination address. The egress part then sends the packet to a next hop node from the determined outgoing port with the created new destination parameter attached to the packet.

Different embodiments are possible in the latter method and apparatus above. For example, if the encrypted destination address in the received packet is randomised by a bit-sequence in the received destination parameter, the decryption unit may learn the bit-sequence from the destination parameter and the encrypted destination address is then decrypted using the learned bit-sequence. The encryption unit may also randomise the destination address by a new bit-sequence when creating the new destination parameter.

The next hop node may belong to the same router domain as the above router and the key used for encrypting the destination address is then shared within that router domain. Alternatively, the next hop node may be an edge router belonging to a neighbouring router domain and the key used for encrypting the destination address is then shared with that edge router.

Further possible features and benefits of the present invention will become apparent from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention provides a security solution for protecting the routing of data packets through a packet data network along a transmission path between a sending end-host and a receiving end-host. The security solution can be built into the core protocol of the forwarding architecture used by routers in the packet data network. Generally, all packets transmitted over a public packet data network must pass the forwarding mechanism in the forwarding plane of each router in the transmission path, e.g. as described above. By embedding a security mechanism within the forwarding plane in a router, to be described below, the resulting security will effectively be enforced in the IP infrastructure to protect the routing of any packet passing that router.

The security mechanism is accomplished by applying encryption on a destination address in a data packet at each forwarding operation in the transmission path, particularly when transmitted from an egress part of one router to an ingress part of another router as the next hop. Typically, the destination address in the data packet is a conventional IP address of the targeted end-host, although the present invention is not generally limited thereto.

Thus, when a first router receives a data packet with an encrypted destination address, the destination address is decrypted using a key known to the first router and the outgoing port is determined for the packet based on the destination address by means of a forwarding table in the first router. The destination address in the packet is then encrypted again using an encryption key known by the next hop node, before sending out the packet on the outgoing port towards a second router as the next hop in the transmission path, and so forth.

Since the destination address, e.g. a regular IP address, is available encrypted in the packet, the existing forwarding operation can be used in the routers in a conventional manner, i.e. based on the decrypted destination address.

Figure 1:
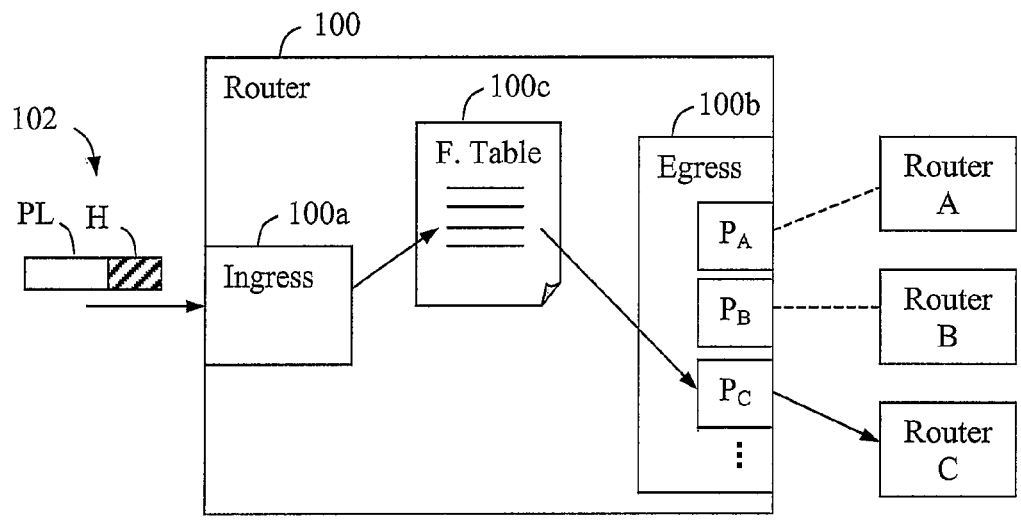
FIG. 1 is a schematic block diagram illustrating a router in an IP network, according to the prior art.
Figure 2:
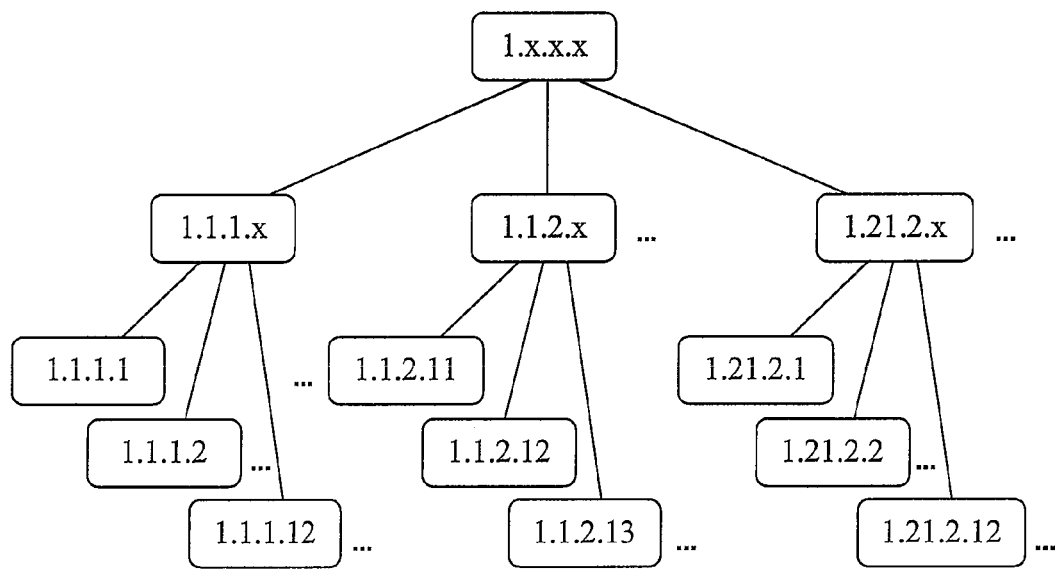
FIG. 2 illustrates a logic structure of a hierarchical bit-mask scheme for IP addresses, according to the prior art.
Figure 3:
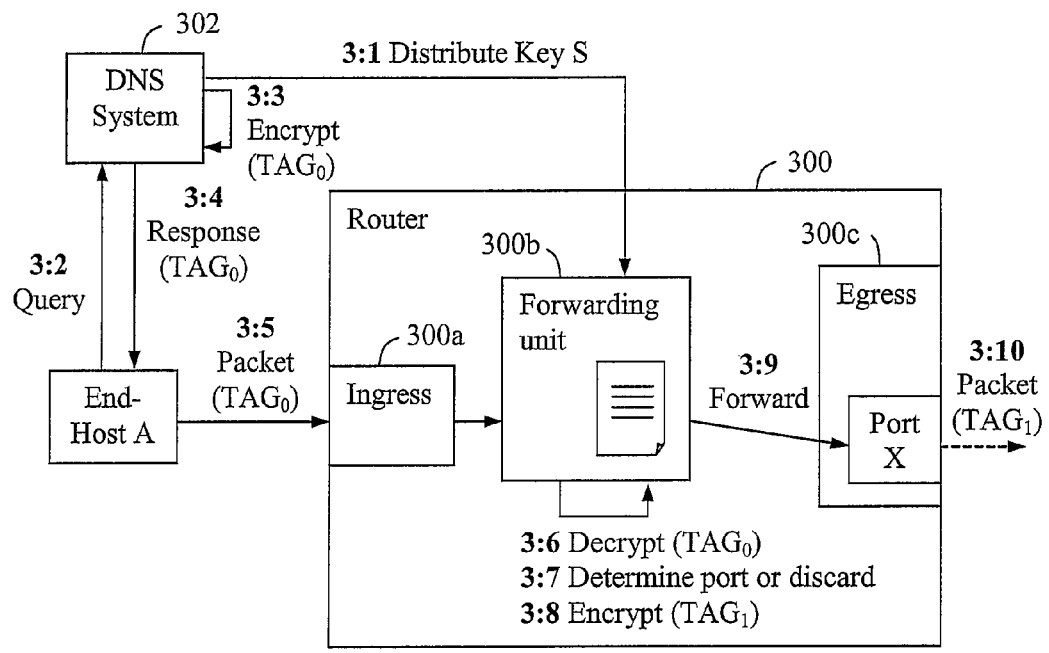
FIG. 3 is a block diagram illustrating how the routing of a data packet can be protected when processed and forwarded in a router, according to one embodiment.

FIG. 3 is a block diagram illustrating how the routing of a data packet in a packet data network can be protected in a router 300, in accordance with an exemplary embodiment. This procedure is shown as a series of actions or steps. In a first configuring step 3:1, a DNS system 302 distributes one or more master keys S for encryption of destination addresses in data packets, to routers in a router domain of the packet data network, including router 300. The distribution of such master keys and possibly other encryption keys to routers may be executed in a configuration process or otherwise, e.g. using a routing protocol for configuring a conventional forwarding architecture in a router domain as described above. A specific key server may be responsible for administrating and distributing master keys to routers in the domain, even though illustrated here as an action made by DNS system 302 for simplicity.

At some point, an end-host A intends to communicate with another end-host, not shown, referred to as the target end-host. In a further step 3:2, end-host A accordingly sends an address query to the DNS system 302 in a conventional manner such as described above, e.g. referring to an e-mail address or web address of the target end-host.

When receiving the address query, DNS system 302 retrieves a destination address D of the target end-host, which could be a regular IP address, from a host database or the like. Optionally, DNS system 302 may also apply a policy defined for the second end-host to the query, to determine if the querying end-host is authorised to send data packets to the target end-host or not. DNS system 302 then encrypts the destination address D, in a following step 3:3, using the previously distributed master key S and creates a parameter generally referred to as a "destination parameter TAG", which is to be attached to any data packet sent from end-host A towards the target end-host.

By way of example, a destination parameter TAG could be defined as:

$$TAG = (Encrypt(S, D, RAND) \| RAND)$$

where "Encrypt" is the encryption function used, "RAND" is a randomising bit-sequence, and "||" denotes concatenation. The destination address D is thus randomised with the bit-sequence RAND and encrypted by the master key S. Alternatively, the destination address D may be encrypted by a different encryption key Si derived from the master key S. In that case, the routers are capable of deriving the same key Si from the distributed master key S for decryption and encryption of TAG. Generally stated, the destination address D is encrypted by "a key dependent on the master key", i.e. either S or Si. In step 3:3, DNS system 302 also creates an initial version of the destination parameter TAG denoted $TAG_0$ where the destination address D is randomised or concatenated with a specific bit-sequence $RAND_0$.

DNS system 302 responds to the querying end-host A in a next step 3:4 by sending the created destination parameter $TAG_0$ thereto. In a further step 3:5, end-host A sends a data packet towards the target end-host with the obtained destination parameter $TAG_0$ attached, which is received by an ingress part 300a at router 300. It should be noted that end-host A simply attaches the obtained $TAG_0$ as is to the packet, and no other processing of $TAG_0$ such as decryption is necessary at end-host A. $TAG_0$ can be inserted in the destination field in the packet header, just as the destination IP address would be conventionally according to the prior art.

A forwarding unit 300b at router 300 is generally configured to perform a forwarding operation for each incoming data packet. In a further step 3:6, forwarding unit 300b decrypts the destination address D in the attached destination parameter $TAG_0$ using the previously distributed master key S, or alternative encryption key Si, and the bit-sequence $RAND_0$ learned from $TAG_0$.

Forwarding unit 300b is then able to perform a forwarding operation based on the decrypted destination address D, in a further step 3:7, in order to determine the correct outgoing port for the next hop, in this case denoted "port X". The forwarding operation as such can be performed in a conventional fashion by means of a forwarding table based on the destination address D of the target end-host, e.g. an IP address. Otherwise the packet will be discarded, that is if the decrypted destination address D is not valid for routing and the forwarding operation cannot be done.

In a next step 3:8, assuming that the forwarding operation was successful, forwarding unit 300b randomises the destination address D with a new specific bit-sequence $RAND_1$ and encrypts the destination address D using the key S or Si, basically in the manner described for step 3:3 above. The randomised and encrypted destination address D is then enclosed in a next version of the destination parameter denoted $TAG_1$ which is attached to the packet, e.g. in the destination field of the packet header. The next version $TAG_1$ can thus be considered to be a "new" destination parameter TAG different from the previous $TAG_0$ even if it contains the same destination address D encrypted by the same key as before. In some routers along the transmission path, the encryption key S or Si may be different from the one previously used, which will be described in more detail below.

In a further step 3:9, the packet including $TAG_1$ is forwarded to the outgoing port X determined in the forwarding operation of step 3:7 above. Finally, the packet is sent out on port X as the next hop, in a last step 3:10. The next receiving router will then be able to decrypt the destination address D, using the distributed master key S and the bit-sequence $RAND_1$ enclosed in the packet, in the same fashion as described above. The last router in the transmission path before the target end-host may or may not encrypt destination address D according to step 3:7, although the target end-host may not need to read the destination field at all if being a single node.

Figure 4:
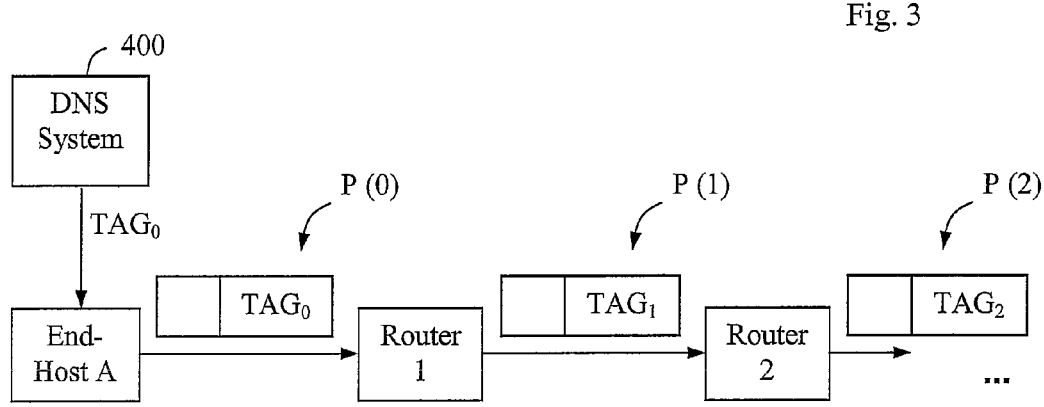
FIG. 4 is a block diagram illustrating how a data packet is modified at each hop in a transmission path, according to another embodiment.

FIG. 4 illustrates how the destination parameter TAG of a data packet is changed at different hops in a transmission path from a packet sending end-host A, by applying different randomising bit-sequences when encrypting the destination address in the packet. Moreover, each successive packet in a multi-packet communication will contain a unique TAG different from the previous one by applying different randomising bit-sequences for each packet. By concealing the destination address D in different destination parameters TAG for each hop in this way, it is virtually impossible for an unauthorised party to intercept the IP address of the target end-host and send unsolicited data packets thereto, thereby adding protection and security in the routing process. Moreover, it is very difficult to link successive packets to a specific destination or session due to the randomisation, resulting also in improved privacy.

One skilled in the art will realise that the destination parameter TAG can be differentiated in other alternative ways, instead of using different randomising bit-sequences as described above, and the present invention is not limited in this respect. For example, a series of keys may be distributed to the routers which can be used one by one according to a known sequence or scheme when encrypting the destination address D at successive routers. Other possible options to obtain differentiation of TAG include using a monotonically increasing sequence number or a timestamp. In the example of FIG. 4, randomising is used for differentiation of TAG in the manner described above.

Thus, a DNS system 400 provides an initial version of the destination parameter $TAG_0$, randomised by a bit-sequence $RAND_0$, to end-host A in response to an address query therefrom. When transmitted from end-host A to the first router in the transmission path, the packet P(0) contains that destination parameter $TAG_0$ unaffected by end-host A. When transmitted from the first router to the second router in the transmission path, the packet P(1) contains a different destination parameter $TAG_1$ randomised by a new bit-sequence $RAND_1$, and when transmitted from the second router, the packet P(2) contains yet another destination parameter $TAG_2$ randomised by a further bit-sequence $RAND_2$, and so forth. Thus, the routers in the transmission path modify the destination parameter TAG by applying different unique randomising bit-sequences when encrypting the destination address in the packet.

Within a router domain in an IP network, the master key S could be distributed to routers by means of a link state protocol using a so-called opaque LSA (Link-State Advertisements) option. Preferably, the key S is also updated at some point, e.g. after a certain expiry time. For example, a key server responsible for selecting and handling the master key S may periodically distribute or "flood" a currently valid key S in the domain. Thus, different master keys, or different series of encryption keys, will be used for encrypting the destination address D of a data packet when transmitted over multiple router domains.

When the packet is to be transferred from an edge router in one domain referred to as an egress router, to an edge router in another neighbouring domain referred to as an ingress router, the master key implemented in the first domain cannot be used since a different master key is presumably implemented in the neighbouring domain. This can be solved by applying a specific border encryption key between each egress/ingress router pair in neighbouring router domains, and the edge routers in both domains know their own domain's master encryption key as well as the border encryption key.

Figure 5:
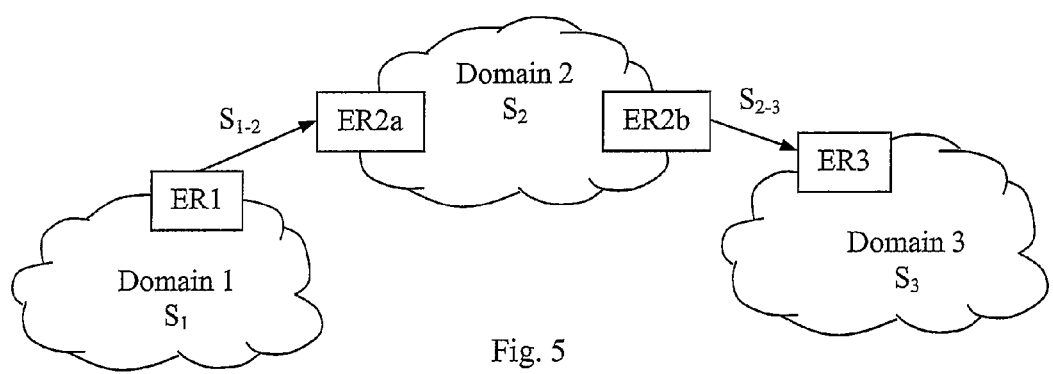
FIG. 5 illustrates schematically how different encryption keys are used in multiple network domains when transmitting data packets, according to yet another embodiment.

FIG. 5 illustrates schematically how different keys S are used for encryption when transmitting data packets in the manner described above in a multiple router domain structure. A master key $S_1$ is implemented within a first router domain 1. Further, master keys $S_2$ and $S_3$ are implemented within second and third router domains 2, 3, respectively. A border encryption key $S_{1-2}$ is implemented in interconnected edge routers ER1 and ER2a belonging to the neighbouring router domains 1 and 2, respectively. Also, a border encryption key $S_{2-3}$ is implemented in interconnected edge routers ER2b and ER3 belonging to the neighbouring router domains 2 and 3, respectively. Hence, edge router ER1 knows keys $S_1$ and $S_{1-2}$, edge router ER2a knows keys $S_2$ and $S_{1-2}$, edge router ER2b knows keys $S_2$ and $S_{2-3}$, and finally edge router ER3 knows keys $S_3$ and $S_{2-3}$.

Further security can also be added for authorising querying end-hosts at the DNS system in the following manner: Initially, when an end-host sends an address query to the DNS system, e.g. as in step 3:2 above, the end-host must know the address or corresponding destination identity of the DNS system for such queries. The DNS address could be a well-known address, but it could also be obtained only from a DHCP (Dynamic Host Configuration Protocol) server, which is a well-known node in the art. In one embodiment, the DHCP server provides an encrypted tag of the DNS required for making address queries, which can only be obtained by hosts after being authenticated via DHCP. If an address query lacks the required encrypted tag of the DNS, the query will be denied and the querying end-host is prevented from sending packets to the target end-host.

Since an explicit destination address can be obtained from the destination parameter TAG above, it is an advantage that the existing address hierarchy and forwarding process can be utilised. At the same time, the destination can be further protected from unsolicited data packets by allowing only end-hosts authorised for DNS/DHCP to get across data packets in the forwarding procedure in routers, and/or by applying a policy defined for the second end-host to each address query.

Moreover, since the destination parameter TAG is made unique at each hop, an attacker listening to the traffic will see randomly different TAGs even for packets of the same destination. Still further, the master key S could also be changed periodically as mentioned above. For example, the server responsible for key distribution may advertise a different master key S at each opaque LSA flooding. In this case, it may be helpful to also include a pointer to the key used, or "key identity", in the TAG of each packet, to avoid key synchronization problems between routers.

When using an encryption key Si derived from a distributed master key S, as suggested above for step 3:2, it is possible to arrange the key derivation so that Si will not disclose or "leak" information about the master key S. For instance, this could be accomplished by defining Si=F(S, . . . ), where F is a cryptographic one-way function.

The following policy enforcement schemes are also possible to apply for preventing or at least reducing unwanted traffic according to an employed packet admission policy:

1) Two different end-hosts querying for the same destination address can be provided with different destination parameters TAGs by means of randomisation or other differentiating techniques. Since the routers know the keys for the encrypted IP-addresses by the key distribution above, each router can decrypt the destination address correctly and forward the packets towards the same destination.

2) The validity period or duration for a master key S can be restricted. When sending multiple packets to the same destination, the sending end-host then needs to re-new the destination parameter TAG whenever the key S is updated, e.g. at certain intervals. Consequently, any re-transmitted packets using the previous master key which in the meantime has expired, should be "allowed" or "not allowed" subject to packet restriction depending on the employed packet admission policy. This can be used to stop a suspected ongoing flooding attack, i.e. the key server could generate and distribute a new master key in the network.

Using the two policy enforcement schemes above in combination means that even a coalition of conspiring attackers cannot flood a victim with unsolicited packets in a so-called "Distributed DoS (DDoS) attack".

If the key validity period is made so short that each packet must be created with a new updated key, effectively providing the finest possible granularity of packet admission control, a heavy load is imposed on the key server distributing these "one-off" keys. Further, it seems reasonable to admit any re-transmitted packet with the same key as before, although implying that the "strictest" level of DoS protection may not be feasible. Hence, the routing infrastructure should admit and route more than one packet to the same host under the same key. Considering the factors above, it may be necessary to make a trade-off between the granularity of protection against illegitimate flooding and the need of legitimate re-transmissions.

Figure 6:
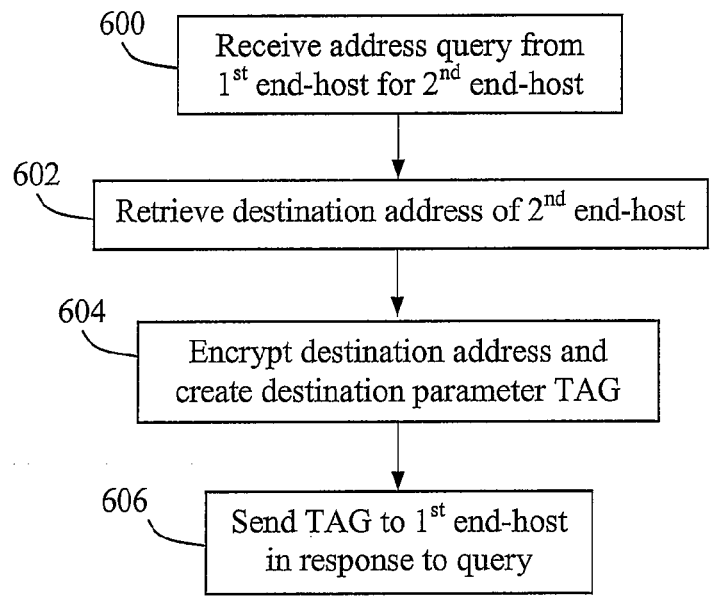
FIG. 6 is a flow chart with steps in a procedure performed by a DNS server system, for protecting the routing of a data packet in a packet data network, according to yet another embodiment.

FIG. 6 is a flow chart with steps in an exemplary procedure for protecting the routing of data packets in a packet data network, as executed by a DNS server system, e.g. the DNS system 302 in FIG. 3. Again, it is assumed that a master key for encryption of destination addresses has been distributed to routers in the packet data network, e.g. from a key server or the like. It is further assumed that the DNS system also knows the master key. In a first step 600, an address query is received from a first end-host requesting a destination address of a second end-host, thus being the target end-host. The address query can be made in a conventional manner such as described above, e.g. referring to an e-mail address or web address of the second end-host.

In a next step 602, the DNS system retrieves a destination address associated with the second end-host, typically an IP address. Optionally, authentication of the first end-host via DHCP, or the checking of an admission policy of the second end-host, may be required in order to process the query further, as described above. In that case, the DNS system will reject the query, not shown here, if the first end-host is not authenticated or allowed to send packets. In a further step 604, the DNS system encrypts the retrieved destination address by the master key, or by a key derived therefrom, and creates a destination parameter TAG containing the encrypted destination address. In TAG, the destination address may also be randomised with a bit-sequence RAND, as described above.

In a final shown step 606, the DNS system sends the created destination parameter TAG to the first end-host in response to the query of step 600. Thereby, the first end-host is able to get across data packets to the second end-host, by attaching the obtained TAG to each transmitted packet.

Figure 7:
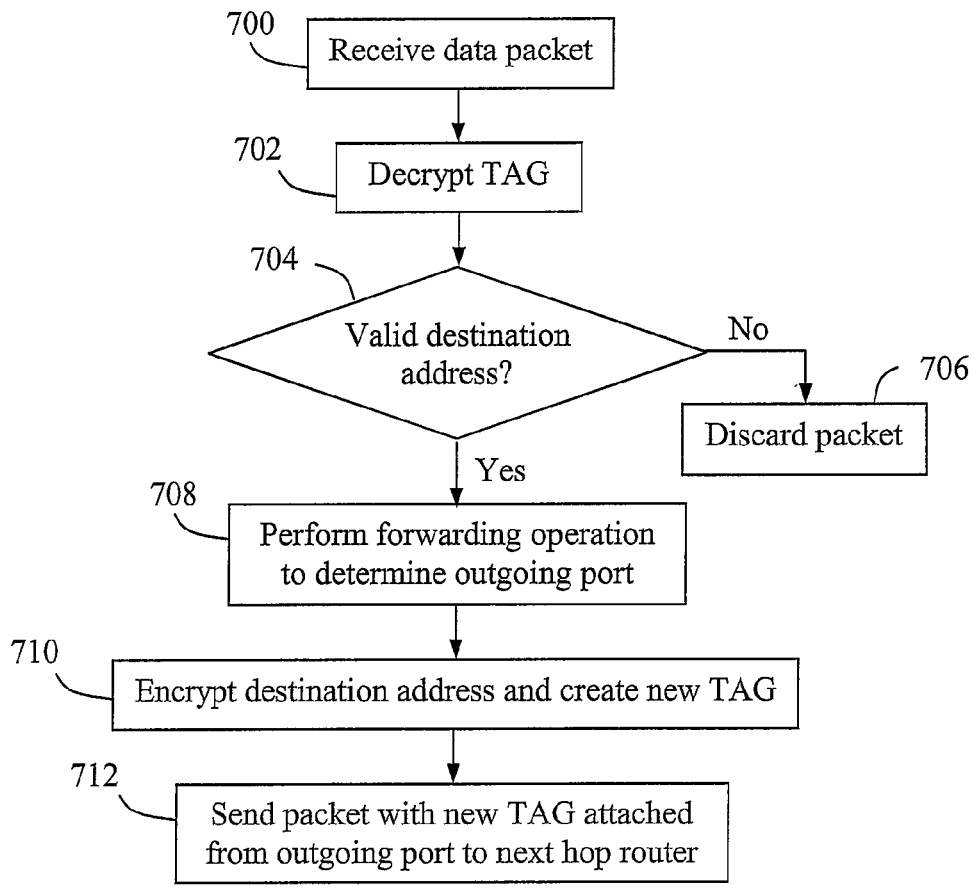
FIG. 7 is a flow chart with steps in a procedure performed by a router, for protecting the routing of a data packet in a packet data network, according to yet another embodiment.

FIG. 7 is a flow chart with steps in an exemplary procedure for protecting the routing of data packets in a packet data network, as executed by a router in the packet data network, e.g. the router 300 in FIG. 3. In a first step 700, a data packet is received by the router. The packet may have been transmitted either from a neighbouring router or from a sending end-host as the first hop.

Optionally, it may be checked whether the received packet contains a required destination parameter $TAG_x$ that should include a valid destination address encrypted by the distributed master key, or by a key derived therefrom. If no such destination parameter $TAG_x$ is found, the packet will be discarded, however not shown here. Assuming that the required destination parameter $TAG_x$ is found, decryption is applied to the $TAG_x$ using the known master key, in a next step 702.

It is then determined in a following step 704 whether a valid destination address can be derived by applying decryption to the destination parameter $TAG_x$. If not, the packet is discarded in a step 706. Otherwise, a forwarding operation is performed in a further step 708, based on the decrypted and valid destination address, in order to determine the correct outgoing port to send out the packet from, leading to the next hop node, such as another router in the transmission path of the packet towards a target end-host.

After the outgoing port has been determined in step 708, the destination address is encrypted again and a new destination parameter $TAG_{x+1}$, including the newly encrypted destination address, is created for the packet, in a step 710. Finally, the packet is sent to the next hop node from the determined port with the created new destination parameter TAG attached, in a last shown step 712. The receiving next hop node is then able to basically repeat the procedure according to steps 700-712 above.

Figure 8:
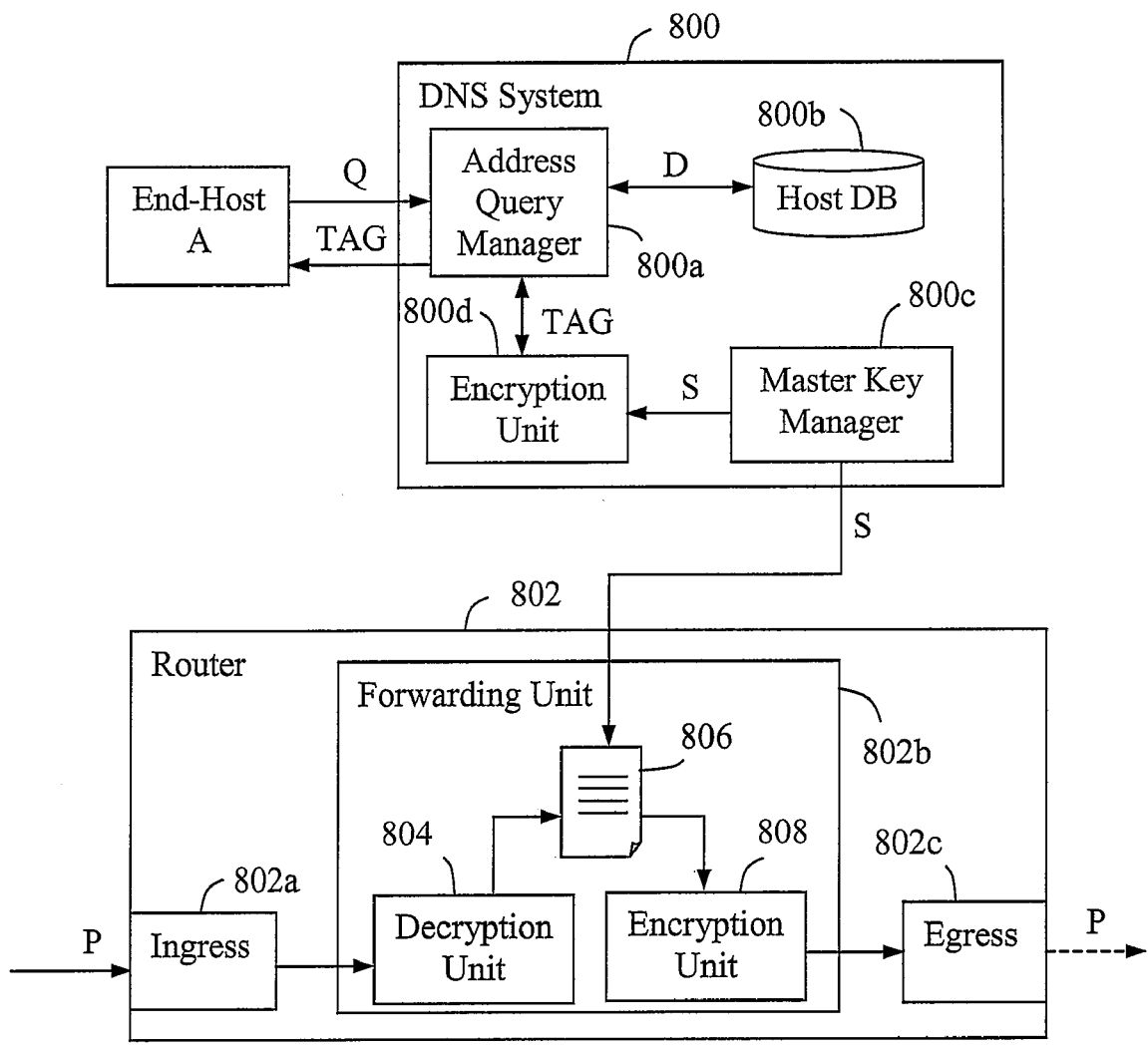
FIG. 8 is a schematic block diagram illustrating a DNS server system and a router in more detail, according to yet another embodiment.

FIG. 8 is a logic block diagram illustrating in more detail an apparatus in a DNS server system 800 and an apparatus in a router 802, for protecting the routing of data packets in a packet data network, in accordance with further exemplary embodiments. DNS system 800 comprises an address query manager 800*a* adapted to receive an address query Q from a first end-host requesting a destination address of a target second end-host, e.g. a regular IP address. DNS system 800 further comprises a host database 800*b* for generally storing destination addresses associated with end-hosts. In particular, the host database 800*b* is adapted to provide the requested destination address D to the address query manager 800*a*.

DNS system 800 also comprises a master key manager 800*c* adapted to manage encryption keys used in the packet data network, and particularly to distribute at least a master key S to routers in the packet data network, including router 802 as shown in the figure. DNS system 800 further comprises an encryption unit 800*d* adapted to encrypt the requested destination address D by the distributed master key S, or by a key Si derived therefrom, and to create a destination parameter TAG containing the encrypted destination address D. The address query manager 800*a* is further adapted to send the created destination parameter TAG to the first end-host in response to the address query Q. Thereby, the first end-host is able to get across data packets to the second end-host by attaching the obtained TAG to each transmitted data packet.

The router 802 comprises an ingress part 802*a* adapted to receive a data packet P from a neighbouring node, not shown, such as another router in the packet data network. The router 802 also comprises a forwarding unit 802*b* adapted to admit the packet P for further routing if a destination parameter TAG attached to the packet includes a valid destination address encrypted by the distributed master key S, or by a key Si derived therefrom. The forwarding unit 802*b* is further adapted to otherwise discard the packet if no such valid destination address can be derived from the packet by decryption.

In more detail, the forwarding unit 802*b* includes a decryption unit 804 for decrypting the encrypted destination address in the packet using the above master key S. The forwarding unit 802*b* is adapted to perform a forwarding operation, based on the decrypted destination address D and using a forwarding table 806, to determine an outgoing port for the packet. The forwarding unit 802*b* further includes an encryption unit 808 for encrypting the destination address D and creating a new destination parameter TAG for the packet including the newly encrypted destination address.

The router 802 also comprises an egress part 802*c* adapted to send the packet to the next hop node, e.g. another neighbouring router, from the determined outgoing port with the created new destination parameter TAG attached to the packet.

It should be noted that FIG. 8 merely illustrates various functional units in the DNS system 800 and the router 802, respectively, in a logical sense. However, the skilled person is free to implement these functions in practice using any suitable software and hardware means. Thus, the present invention is generally not limited to the shown structure of the DNS server system 800 and the router 802.

In any of the above embodiments, the destination parameters TAGs could optionally include a Message Authentication Code MAC based on a key derived from S or Si to enable verification of the TAG before attempting decryption at the routers. For example, a destination parameter TAG may be configured as follows:

TAG=encrypted_IP_address||MAC(encrypted_IP_address).

The present invention provides a mechanism in the IP infrastructure for controlling the routing of data packets to prevent that packets from potentially illicit or corrupt end-users are routed in the network. This mechanism can thus be used to avoid flooding, spamming, virus, fraud, DoS attacks and generally unsolicited traffic.

While the invention has been described with reference to specific exemplary embodiments, the description is generally only intended to illustrate the inventive concept and should not be taken as limiting the scope of the invention. The present invention is defined by the appended claims.

The invention claimed is:

1. A method of protecting the routing of data packets in a packet data network along a transmission path with routers between a first sending end-host and a second receiving end-host, comprising the following steps performed by a DNS server system:
   receiving an address query from the first end-host regarding the second end-host,
   retrieving a destination address associated with the second end-host for said address query,
   encrypting the retrieved destination address by using a key dependent on a master key wherein the master key has been distributed to said routers in the packet data network for encryption of destination addresses in data packets, and creating a destination parameter containing the encrypted destination address,
   sending the created destination parameter to the first end-host in response to said address query, thereby enabling the first end-host to get across data packets to the second end-host by attaching said destination parameter to each transmitted data packet, and enabling the routers to decrypt the encrypted destination address in the data packets from the first end-host using a key dependent on the distributed master key, and
   performing a forwarding operation based on the decrypted destination address and a new encrypted destination address being attached to a forwarded packet to determine an outgoing port for the packet.

2. The method according to claim 1, wherein authentication of the first end-host is required in order to process the query, and the query is rejected if the first end-host is not authenticated.

3. The method according to claim 1, wherein the destination address is randomized by including a bit sequence when creating the destination parameter.

4. An apparatus in a DNS server system for protecting the routing of data packets in a packet data network along a transmission path with routers between a first sending end-host and a second receiving end host, comprising:
- a master key manager adapted to distribute a master key to said routers in the packet data network for encryption of destination addresses in data packets,
- an address query manager adapted to receive an address query from the first end-host regarding the second end-host,
- a host database for storing destination addresses associated with end-hosts, adapted to provide a destination address of the second end-host for said address query, and
- an encryption unit adapted to encrypt said destination address by using a key dependent on said master key, and to create a destination parameter containing the encrypted destination address, wherein the address query manager is further adapted
  - to send the created destination parameter to the first end-host in response to the address query, thereby enabling the first end-host to get across data packets to the second end-host by attaching the destination parameter to each transmitted data packet, and enabling the routers to decrypt the encrypted destination address in the data packets from the first end-host using a key dependent on the distributed master key, and
  - to perform a forwarding operation based on the decrypted destination address and a new encrypted destination address being attached to a forwarded packet to determine an outgoing port for the packet.

5. The apparatus according to claim 4, wherein authentication of the first end-host is required in order to process the query, and the address query manager is further adapted to reject the query if the first end-host is not authenticated.

6. The apparatus according to claim 4, wherein the encryption unit is further adapted to randomize the destination address by including a bit-sequence when creating the destination parameter.

7. A method of protecting the routing of data packets in a packet data network along a transmission path with routers between a first sending end-host and a second receiving end-host, comprising the following steps performed by a router in said transmission path of the packet data network:
- receiving a data packet,
- attempting to decrypt a destination address in the received data packet using a key dependent on a master key which has been distributed from a DNS server system for encryption of destination addresses in data packets,
- admitting the packet if a destination parameter including a valid destination address can be derived from the packet by decryption, and discarding the packet if no such destination parameter can be derived from the packet by decryption,
- performing a forwarding operation based on the decrypted destination address to determine an outgoing port for the packet,
- encrypting the destination address using said key dependent on the master key, and creating a new destination parameter for the packet including the newly encrypted destination address, and
- sending the packet to a next hop node from the determined outgoing port with the created new destination parameter attached to the packet.

8. The method according to claim 7, the encrypted destination address being randomized by a bit-sequence in the received destination parameter, wherein said bit sequence is learned from the destination parameter and the encrypted destination address is decrypted using the learned bit-sequence.

9. The method according to claim 8, wherein the destination address is randomized by a new bit-sequence when creating the new destination parameter.

10. The method according to claim 7, wherein the next hop node belongs to the same router domain as said router and the key used for encrypting the destination address is shared within said router domain.

11. The method according to claim 7, wherein the next hop node is an edge router belonging to a neighboring router domain and the key used for encrypting the destination address is shared with said edge router.

12. An apparatus in a router in a transmission path of a packet data network between a first sending end-host and a second receiving end-host for protecting the routing of data packets, comprising:
- an ingress part adapted to receive a data packet,
- a forwarding unit including a decryption unit adapted to attempt decryption of a destination address in the received data packet using a key dependent on a master key which has been distributed from a DNS server system for encryption of destination addresses in data packets, wherein the forwarding unit is adapted to admit the packet if a destination parameter including a valid destination address can be derived from the packet by decryption, to discard the packet if no such destination parameter can be derived from the packet by decryption, and to perform a forwarding operation based on the decrypted destination address to determine an outgoing port for the packet, the forwarding unit further including an encryption unit for encrypting the destination address using said key dependent on the master key, and creating a new destination parameter for the packet including the newly encrypted destination address, and
- an egress part adapted to send the packet to a next hop node from the determined outgoing port with the created new destination parameter attached to the packet.

13. The apparatus according to claim 12, the encrypted destination address being randomized by a bit-sequence in the received destination parameter, wherein the decryption unit is adapted to learn said bit sequence from the destination parameter and decrypt the encrypted destination address further using the learned bit-sequence.

14. The apparatus according to claim 13, wherein the encryption unit is adapted to randomize the destination address by a new bit-sequence when creating the new destination parameter.

15. The apparatus according to claim 12, wherein the next hop node belongs to the same router domain as said router and the key used for encrypting the destination address is shared within said router domain.

16. The apparatus according to claim 12, wherein the next hop node is an edge router belonging to a neighboring router domain and the key used for encrypting the destination address is shared with said edge router.

* * * * *